Sept. 15, 1953
J. BERGER
2,652,197
PREDETERMINING SYSTEM, INCLUDING DEVICES PROVIDING
CONTINUOUS OPERATION WITHOUT HOMING OR RESETTING
Filed Jan. 28, 1949
4 Sheets-Sheet 1

INVENTOR.
Jacques Berger
BY
Atty

INVENTOR.
Jacques Berger

INVENTOR.
Jacques Berger

Patented Sept. 15, 1953

2,652,197

UNITED STATES PATENT OFFICE 2,652,197

PREDETERMINING SYSTEM, INCLUDING DEVICES PROVIDING CONTINUOUS OPERATION WITHOUT HOMING OR RESETTING

Jacques Berger, Chicago, Ill., assignor to Welding Research, Inc., Chicago, Ill., a corporation of Illinois Application January 28, 1949, Serial No. 73,299

22 Claims. (Cl. 235—132)

This invention relates to a pace making circuit and to various timing, counting and control systems based on the pace making circuit.

There are many applications in which it is desired to control equipment at a regular interval or pace. For example, such systems are used in predetermined counters in which it is desired to count a particular number of objects and then after operating a control, proceed with counting the next number. Such a system could be used in packing or bottling objects so that after a predetermined number of objects are placed in a container the control places the next container in position and the required number are supplied thereto. Pace making circuits may also be used in timing mechanisms in which it is desired to operate controls after various time intervals which are continuously repeated. By providing regularly spaced intervals and causing controls to operate after a predetermined number of intervals, the effect is to provide operations at predetermined time intervals. Such a system would find application in a timing machine wherein various operations are performed and it is desired for each operation to be carried on for a predetermined length of time. An example of such a device would be an automatic washing machine. It is obvious that there are many other applications in which repeated sequences of numbers or time intervals are required for controlling equipment, such as in electrical resistance welding machines.

It is, therefore, an object of the present invention to provide pace making apparatus in which the extent of each pace can be adjusted as desired and resetting of the apparatus is not required between successive paces.

A further object of this invention is to provide simple pace making apparatus which is applicable for various uses as for predetermined counting, timing, and sequencing operations.

A still further object of this invention is to provide a pace making system in which a plurality of paces of different extent can be provided and continuously repeated without loss of time between the successive paces.

Another object of this invention is to provide control operations in which repeating paces are provided and controls may be provided intermediate each pace.

A feature of this invention is the provision of pace making apparatus including a pair of step-by-step operated devices and a system for connecting the devices to any source of impulses so that each device will count a predetermined number of impulses which may or may not be equally spaced and then stop while the other device counts the predetermined number, with said devices operating alternatively and resetting thereof not being required.

A further feature of this invention is the provision of a timer in which regularly spaced pulses control the pace making apparatus to provide the desired time intervals. The pulses are not necessarily equally spaced as will be more fully set forth.

A still further feature of this invention is the provision of control apparatus for providing a repeating sequence of control operations with the intervals between the succeeding operations being adjustable as desired.

Further objects, features and advantages will be apparent from the following description taken in connection with the accompanying drawings in which:

Fig. 5 illustrates a modification for increasing the speed of operation of the systems.

Although the invention is illustrated by a system in which stepping switches and relays are used, it is to be pointed out that various other known step-by-step devices can be used in the same manner as the stepping switches and various other devices responsive to the step-by-step devices can be used in the same manner as the relays.

In practicing the invention there is provided a system including a pair of stepping switches and a pair of relays individually associated with the switches for applying pulses to the windings thereof. The relays include contacts for connecting the energizing windings of the stepping switches to a source of pulses and in addition include contacts arranged in holding circuits so that each relay remains energized until the other relay is energized. Circuits are established through the contacts of the stepping switches so that after each switch is operated through a predetermined number of steps the relay associated with the other stepping switch is energized. This causes the other stepping switch to start operating and the relay associated with the first stepping switch to be de-energized so that the first stepping switch stops. Thereafter the stepping switches alternatively operate through the predetermined number of steps. The interconnection of the stepping switches is such that the switches can be used to produce a pace including any desired number of steps, within the limit of the particular switch structure, without any resetting of the switches. Arrangements are also provided whereby switches can be connected in series to provide paces having a greater number of steps. By providing stepping switches having a larger number of switch levels, controls at intermediate points in each pace can be provided. Also a plurality of paces of different lengths can be successively produced and repeated in sequence by modification of the system to include more than two stepping switches and a corresponding number of relays.

Figure 1:
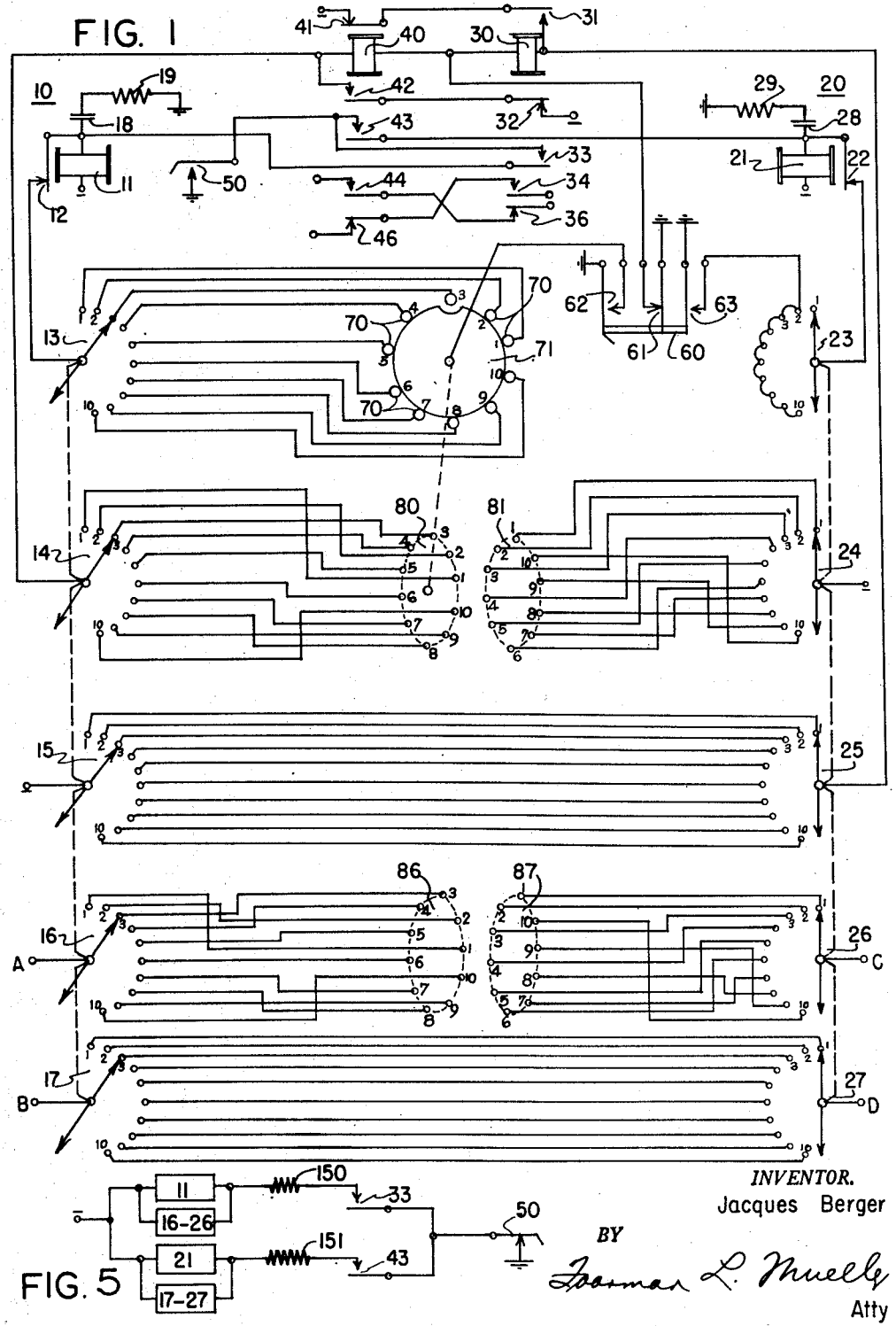
Fig. 1 illustrates the basic operation of a pace making system in accordance with the invention.

In Fig. 1 there is illustrated a system including stepping switches 10 and 20 and relays 30 and 40. The relay 30 is associated with the stepping switch 10 and correspondingly the relay 40 is associated with the stepping switch 20. The stepping switch 10 includes a driving mechanism 11, interrupter contact 12 and contact levels 13, 14, 15, 16 and 17. The contact levels are each shown as including 10 contacts but it is pointed out that this number is used only as an example and for simplicity of the disclosure, and a larger number of contacts may be provided. The stepping switch 20 similarly includes actuating mechanism 21, interrupter contact 22, and contact levels 23, 24, 25, 26 and 27. The relay 30 includes three sets of contacts 31, 32 and 33 and similarly relay 40 includes three sets of contacts 41, 42 and 43. Contacts 33 when closed by relay 30 connect the actuating mechanism 11 of the switch 10 between the terminal marked minus and ground through the operating switch 50. In a similar manner contacts 43 of relay 40 connect the actuating mechanism 21 of the switch 20 between minus and ground through the operating switch 50. Spark protection is provided for these contacts by the condensers 18 and 28 and resistors 19 and 29. The contacts 31 and 41 form a holding circuit for the relay 30 with the contacts 41 being normally closed and the contacts 31 being normally open but closed when the relay 30 is actuated. This provides a closed circuit between minus and ground through the contacts 61 of homing switch 60. After relay 30 is actuated, this circuit will be retained closed until the relay 40 is actuated, when the contacts 41 will open to break the holding circuit. Similarly the contacts 32 and 42 form a holding circuit for the relay 40 which will hold relay 40 actuated until the contacts 32 are broken by actuation of relay 30.

The levels 13 and 23 of the switches 10 and 20 are the homing levels and are used to set up the initial positions of the switches 10 and 20 so that the switches are in position for the desired operation. The movable contacts at the homing levels are of the bridging type which engage the succeeding contact before contact with the preceding contact is broken. The contacts of the level 13 are connected to a plurality of contacts 70 which cooperate with an adjustable contact plate 71. The adjustable contact plate 71 is arranged to make connection with all of the fixed contacts 70 except one, the contact 3 being shown open in Fig. 1. Any other connecting means producing this function can, obviously, be used. The adjustable contact plate 71 is connected through the contacts 62 of the homing switch to ground. The contacts of the level 23 of switch 20 are all connected to ground through the contacts 63 of the homing switch with the exception of contact No. 1, in the example illustrated. The moving contact arms of the homing levels 13 and 23 are adapted to energize the actuating mechanisms 11 and 21 of the switches 10 and 20, respectively, through the interrupter contacts 12 and 22. It is, therefore, seen that when the homing switch 60 is moved to the right, the contact arm of switch 10 will rotate until the arm on level 13 reaches the open contact of the group 70. In Fig. 1 contact 3 is the open contact and, therefore, the switch will stop on the No. 3 contact. The switch 20 will be operated until the switch contact reaches the No. 1 position which is the open position. As will be described more in detail, by changing the position of the adjustable contact plate 71 the homing position of the switch 10 will be changed to provide a different pace.

The contacts of switch levels 14 and 24 are interconnected through a differential connection including the members 80 and 81. These two members include a number of contacts equal to the number of contacts on each level of the stepping switches with the contacts on members 80 and 81 being in engagement to interconnect the two levels. The interconnection, however, may be varied as desired so that the No. 1 contact on level 24 may be connected to any desired contact on level 14. The succeeding contacts will also be interconnected. For example, if No. 1 contact of level 24 is connected with No. 3 contact of level 14, as in Fig. 1, No. 2 contact of level 24 will be connected with No. 4 contact on level 14. The contacts of levels 15 and 25 of the switches 10 and 20, respectively, are permanently and directly interconnected with the No. 1 contact of level 15 at all times being connected with No. 1 contact of level 25, etc. In a simple system the switch levels 16 and 17 of switch 10 and levels 26 and 27 of switch 20 are not necessary. However, systems using these additional levels will be hereinafter described. Any suitable arrangement may be used for providing the adjustable interconnection.

Considering now the operation of the system of Fig. 1 it is to be pointed out that the system as disclosed can be used to provide a pace of any extent up to and including 9 steps. The number of steps in each pace is determined by the setting of the adjustable contact plate 71 and the relative setting of the contact members 80 and 81. By permanently affixing the contact member 81 and mechanically interconnecting the contact plate 71 and contact member 80, a single control can be provided for setting the pace of the apparatus. As previously described, before operating the apparatus the homing switch 60 should be moved to the position for closing contacts 62 and 63 to set the stepping switches at the proper position for initiating operation. Contacts 62 provide a circuit through contact plate 71, level 13, interrupter contacts 12 and actuating mechanism 11 to the negative potential. The interrupter contacts will provide step-by-step operation of the switch 10 in a well known manner until the movable contact engages contact 3 which is not connected to ground through the contact plate 71. This stops the operation of the switch 10. Contacts 63 provide a similar circuit through level 23, interrupter contacts 22 and the actuating mechanism of switch 20. This will cause the switch 20 to step until the No. 1 contact is engaged.

After the homing operation is completed, the switch 60 can be moved to the normal position shown in the drawing with the contact 61 closing to ground one side of the relays 30 and 40. It will be seen that in this position a closed circuit is provided through the winding of relay 40, contact 3 of level 14, terminal 3 of member 80, terminal 1 of member 81, and contact 1 of level 24. This energizes the relay 40 which locks through contacts 32 and 42 and causes contacts 43 to close energizing the winding 21 of stepping switch 20 through the operating switch 50. When pulses of current are provided by intermittent closing of the switch 50, the stepping switch 20 will continue to rotate until the relay 40 is de-energized. This takes place in the system shown when the switch 20 moves two steps as at this time the movable contact of level 25 engages the third contact of this level and this contact is connected to the third contact of level 15 which is connected to minus potential. This causes the relay 30 to actuate and lock itself through contacts 31 and 41. The relay 30 breaks contacts 32 thereby opening the holding circuit for relay 40. The relay 40 is, therefore, de-energized causing the contacts 43 to open and disconnect the stepping switch from the source of pulses. Although the energizing circuit for the relay 40 through the levels 14 and 24 is broken as soon as stepping switch 20 operates and the movable contact of level 24 moves away from contact 1 and thereby disconnects this contact from minus potential, the relay 40 will remain operated through the holding contact 32 and 42 until the relay 30 is operated to break the contacts 32.

The stepping switch 10 may be connected to the source of pulses through contacts 33 of relay 30. Operation of the main operating switch 50 will then cause operation of the stepping switch 10 until the movable contact at level 14 engages contact 5. At this point a closed circuit is provided for relay 40 from contact 5 of level 14 through terminal 5 of member 80 to terminal 3 of member 81 to contact 3 of level 24. It will be remembered that the switch 20 is now in position with the movable contact of level 24 at contact 3 to thereby provide an energizing circuit for relay 40. This opens contacts 41 to break the holding circuit for relay 30 causing switch 10 to be disconnected from the source of pulses. The contacts 43 are thereby closed so that switch 20 is again connected to the source of pulses. It will be obvious that this procedure will continue as long as the main operating switch 50 is intermittently closed. In order to prevent simultaneous operation of both stepping switches in the event that the switch 50 is operated after one relay actuates and before the other has dropped out, additional normally closed contacts may be provided in the relays 30 and 40 in series with contacts 33 and 43. Such an arrangement is illustrated by contacts 35 and 45 in Fig. 2. By providing additional contacts on the relays 30 and 40, such as contacts 34 and 44, operation of any equipment desired can be provided at the end of each pace. In the event that the equipment to be controlled is of such a nature that the circuits controlled by contacts 34 and 44 must not be simultaneously closed, normally closed contacts 36 and 46 may be provided in series with the contacts 44 and 34 respectively. Then if contacts 34 close before contacts 44 open, the circuit through contacts 34 will be held open by contacts 46 until relay 40 releases to open contacts 44 and close contacts 46.

As previously stated, the contact levels 16 and 17 of switch 10 together with the levels 26 and 27 of switch 20 can be used to provide additional control functions. The levels 16 and 26 can be interconnected by a differential connection including members 86 and 87 which may be identical to members 80 and 81. The levels 17 and 27 may be directly interconnected. It is, therefore, seen that when the switch 20 completes a pace the terminals B and D of levels 17 and 27 are interconnected and can be used for closing any desired control circuit. Similarly, when the switch 10 operates and completes the pace, the terminals A and C are interconnected and these terminals may also be used for producing any desired control functions. It is apparent that additional contact levels may be provided if a plurality of independent control circuits are required.

Figure 2:
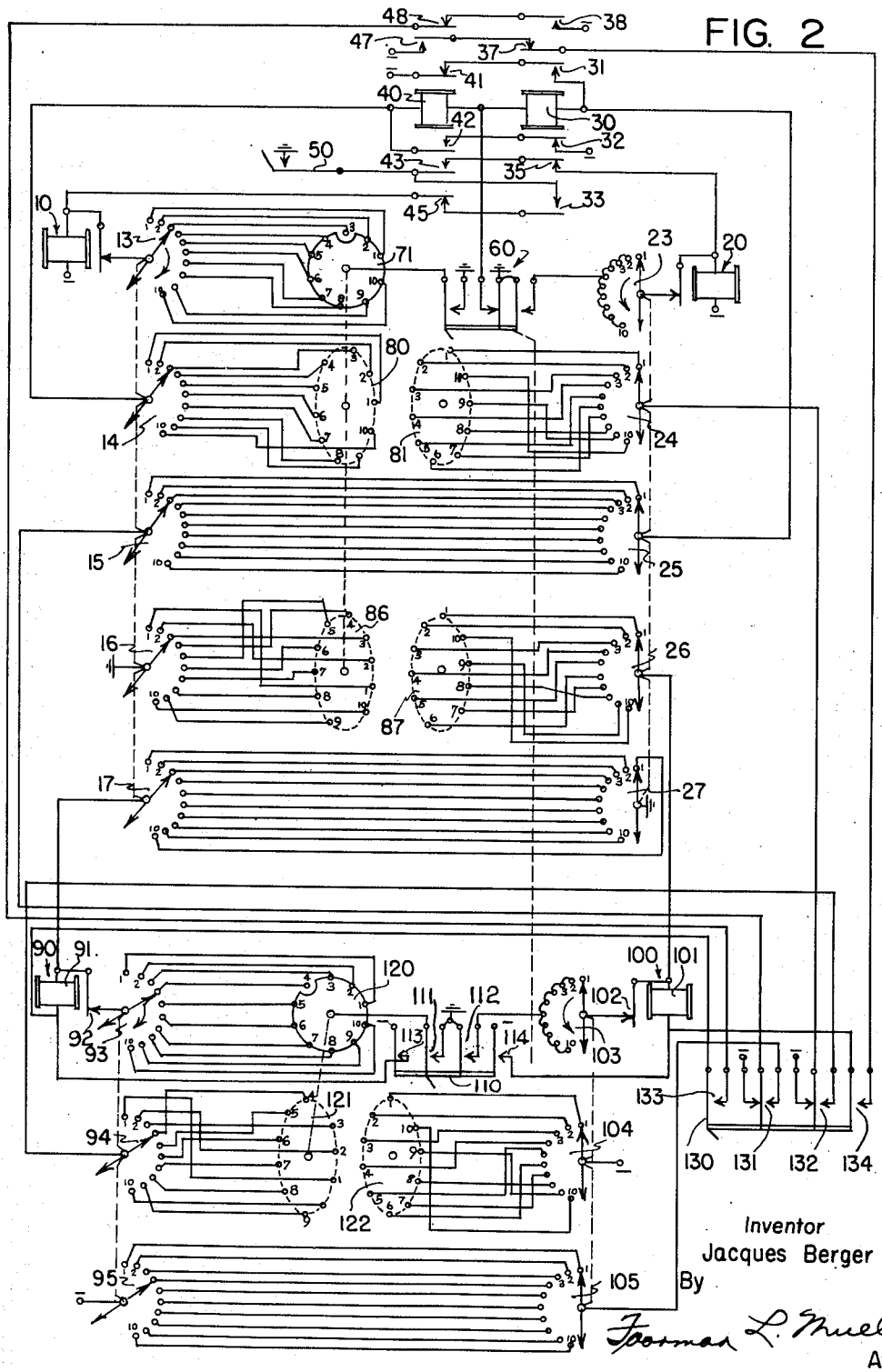
Fig. 2 illustrates a modified system in which the paces may include a large number of steps.

In Fig. 2 there is illustrated a system generally similar to that of Fig. 1 with the exception that two additional stepping switches are provided and arranged so that paces including more steps than the number of contacts on each switch level can be used. As the circuits of Figs. 1 and 2 are generally similar, the same reference characters are applied to the corresponding parts. In addition to the equipment of Fig. 1, stepping switches 90 and 100 are provided in Fig. 2. The switch 90 includes an actuating mechanism 91, an interrupter contact 92 and contact levels 93, 94 and 95, and the stepping switch 100 likewise includes an actuating mechanism 101, interrupter contact 102 and contact levels 103, 104 and 105.

A switch 130 is provided for selectively connecting the stepping switches 90 and 100 into the system of Fig. 1. In the position shown the switches 90 and 100 are not connected in the system and, therefore, the system of Fig. 2 will operate in exactly the same manner as the system of Fig. 1. However, when the switch 130 is moved to the right the switches 90 and 100 are connected into the system. When thus connected the movable contact of level 15 instead of being connected directly to minus potential is connected through contacts 131 to the movable contact of level 105. Similarly the movable contact of level 24 instead of being connected directly to minus potential is connected through contacts 132 to the movable contact of level 94.

A homing circuit including switch 110 is provided for bringing the switches 90 and 100 to the initial position for operation which is generally similar to the homing circuit of Fig. 1. Levels 93 and 103 of the switches are for homing purposes with the contacts of level 93 being connected to terminals adapted to be engaged by adjustable contact plate 120 which is connected to the contacts 111 of the homing switch 110. All of the contacts of level 103 except contact 1 are connected to the contacts 112 of the homing switch 110. Therefore, when the switch 110 is moved to the right, and the switch 130 is also at the right, stepping switch 90 is brought to a position depending upon the setting of contact plate 120 and the switch 100 is moved to the normal position or position in which the contact arm engages contact No. 1 of each level. For providing potential to the stepping switches 90 and 100 during the homing operation, switches 113 and 114 may be provided, and as these switches are to be closed only during the homing operation they may be included as a part of the homing switch 110. The homing switch 110 and the homing switch 60 may be mechanically interconnected so that homing of the system is provided by a single operation. The contacts of levels 94 and 104 are connected through the differential connection provided by contact members 121 and 122 which may be identical to the contact members 80 and 81. The contacts of levels 95 and 105 are directly interconnected.

The stepping switches 90 and 100 are operated in the complete system through the levels 16 and 17 of stepping switch 10 and the levels 26 and 27 of stepping switch 20. The levels 16 and 26 are interconnected through the differential connection including members 86 and 87 as in Fig. 1, but the members are positioned so that there is a difference or slip of one more contact than between the members 80 and 81. As this will always be one more contact, the members 71, 80 and 86 can be mechanically interconnected to be operated by a single control. The levels 17 and 27 may be permanently interconnected, with the connection providing a slip of one contact instead of connecting corresponding contacts as in Fig. 1. That is contact 1 of level 17 is connected to contact 2 of level 27 and so on. The levels 16 and 26 are arranged to apply a potential to the energizing winding 101 of the stepping switch 100 through the contacts 134 of switch 130 and contacts 37 and 47 of relays 30 and 40 respectively. It is, therefore, seen that the stepping switch 100 will be operated only when a closed circuit is provided through levels 16 and 26 and when the relay 30 is released and the relay 40 is actuated. The levels 17 and 27 similarly apply a potential to the energizing winding of stepping switch 90 through contacts 133 of switch 130 and through contacts 38 and 48 of relays 30 and 40 respectively. In this case the stepping switch 90 will be operated only when a closed circuit is provided through levels 17 and 27 and the relay 30 is actuated and the relay 40 is released. In the system of Fig. 2, the number of contacts on the relays 30 and 40 can be reduced by connecting the operating switch 50 directly to the windings of the stepping switches 10 and 20 and connecting negative potential to the stepping switches 10 and 90 through one pair of contacts and connecting negative potential to the stepping switches 20 and 100 through a second pair of contacts.

Considering now the operation of the system of Fig. 2, the adjustable contact plates 71 and 120 and the relative position of members 80 and 81, 82 and 83, and 121 and 122 are set to determine the pace. In a system having ten contacts as shown the position of plate 120 and members 121 and 122 will determine the tens digit of the pace and the position of plate 71 and the relative position of members 81 and 82 and the members 86 and 87 will determine the units digit. As the member 120 is set so that an open circuit is provided at terminal 4, and the members 121 and 122 are positioned so that contact 4 of member 121 engages contact 1 of member 122, the tens digit will be the difference between 4 and 1, or 3. As previously described the contact plate 71 and the members 80 and 81 are positioned so that the units digit is 2. The system of Fig. 2, therefore, is set so that the pace has an extent of 32 steps.

In operating this system, the interconnecting switch 130 must be moved to the right. The homing switches 60 and 110, which may have a common actuating member, are moved to the right so that the stepping switches 10, 20, 90 and 100 are all set at the proper initial positions. The relay 40 will be energized through contact 3 of level 14, contact 1 of level 24, contact 4 of level 94 and contact 1 of level 104. This will cause the stepping switch 20 to operate in response to closing of the operating switch 50. However, when the switch 20 moves to the third contact, the circuit through relay 30 is not closed through levels 25 and 15 as previously described. The movable contact of level 15 is connected to the movable contact 105 which is at position 1 and is directly connected to position 1 of the level 95. The movable contact at level 95 is at position 4 and, therefore, does not energize the circuit through relay 30. The stepping switch 20, will, therefore, continue until the movable contact of level 26 engages and leaves contact 10. This will apply a pulse to the winding 101 of switch 100 causing the contact members thereof to move one step and accordingly the movable contact of level 105 will engage contact 2. It will be apparent that each time the switch 20 sweeps through the ten contacts of the levels thereof, the switch 100 will move one step. Although the stepping switch 20 will not always start at contact 1, the levels 16 and 26 will apply a pulse to the stepping switch 100 each time the switch 20 passes through the contact preceding the contact from which it started. As previously stated, for the stepping switch 100 to be energized, the switch 130 must be to the right, the relay 30 must be released, and the relay 40 must be energized. Therefore, after the switch 20 has moved 30 steps, the movable contact of level 105 will engage terminal 4. When the switch 20 then takes two more steps, a closed circuit will be provided for relay 30 through level 25, level 15, level 105 and level 95. This will cause relay 30 to become energized and relay 40 to be de-energized as previously stated.

When the relay 30 is thus energized, contacts 33 thereof will allow the stepping switch 10 to be energized and respond to the operating switch 50. In this instance the switch 10 will continue in operation until a closed circuit is provided for the relay 40. The energizing circuit for relay 40 extends between level 14, members 80 and 81, level 24, level 94, members 121 and 122 and level 104. It will be apparent from a consideration of Fig. 2 that the stepping switch 90 will not be operated until the stepping switch 10 has passed through the contact preceding that from which it started. The circuit through relay 40 will be closed when the switch 10 moves thirty steps, causing the switch 90 to move three steps, and then the switch 10 moves two additional steps making a total of thirty-two steps. Although the switches 10 and 20 will move the total number of steps in the pace during each pace, the number of steps moved by the switches 90 and 100 will depend upon the tens digit of the number of steps in the pace. The movement of the switches 90 and 100 is independent of the starting point of the switches 10 and 20 so that continuous operation takes place and no resetting is required. By using a larger number of contacts on each switch and by using two or more switches in series in the manner described, paces including a very large number of steps can be provided. Various other transfer arrangements can be used to interconnect a plurality of switches to provide paces having a large number of steps.

Figure 3:
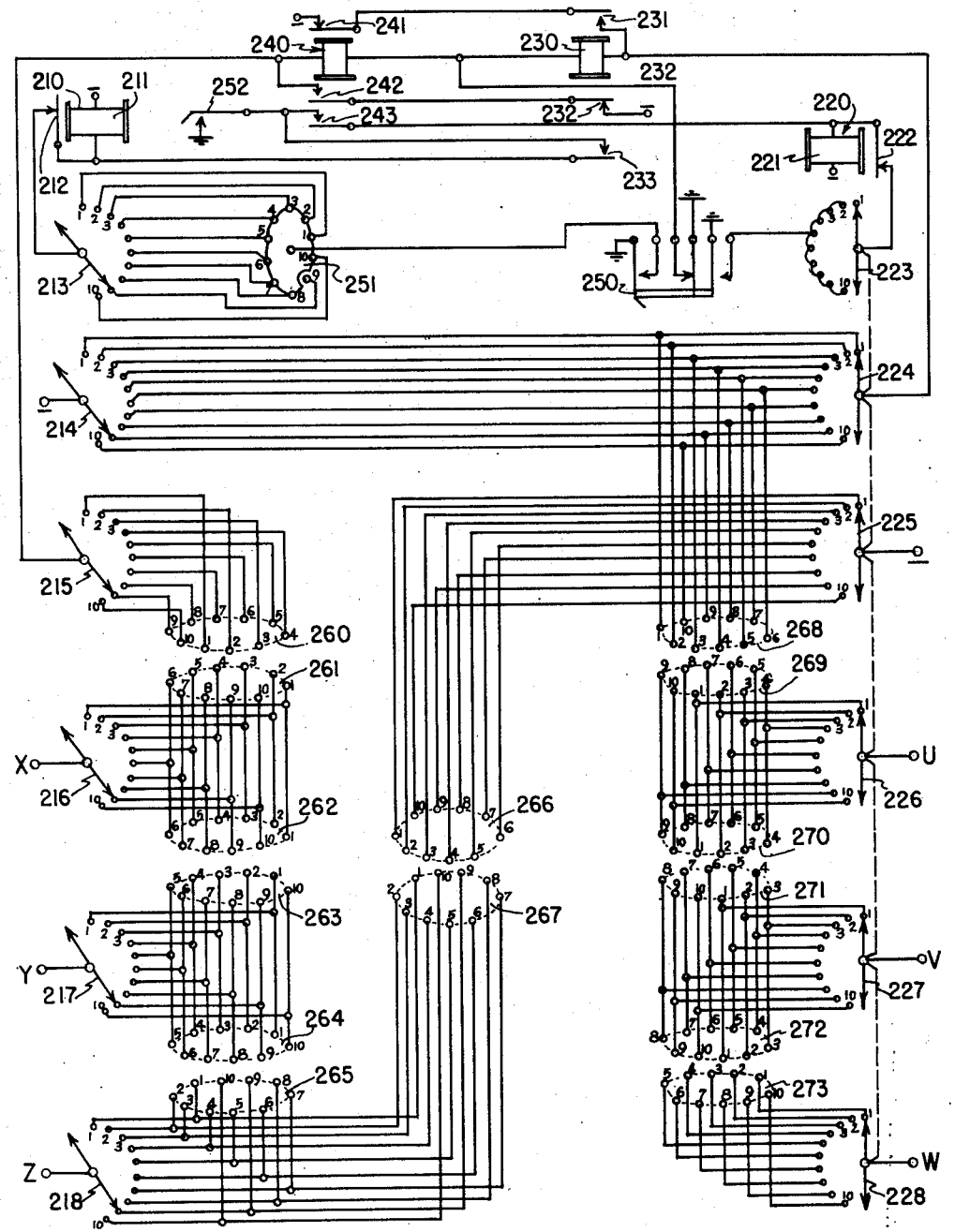
Fig. 3 illustrates a system in which control operations may be provided at intervals intermediate the paces produced by the system.

In Fig. 3 there is illustrated a system which is generally similar to the system of Fig. 1 but in which the stepping switches include extra levels which are connected so that operating controls can be provided at steps intermediate the complete paces. For example, if the equipment is set for operating on paces of eight steps, in addition to the controls at the ends of each pace or eight steps, controls can also be provided after 2, 3, 4, 5, 6 and 7 steps, for example. In this system stepping switches 210 and 220 are provided and relays 230 and 240 are associated therewith. The switch 210 includes an actuating mechanism 211, an interrupter contact 212, and contact levels 213, 214, 215, 216, 217 and 218. Similarly switch 220 includes an actuating mechanism 221, interrupter contact 222, and contact levels 223, 224, 225, 226, 227 and 228. Homing of the switches is obtained through contact levels 213 and 223, with the switch 250 and adjustable contact plate 251 being provided for homing the switch 210 at the contact corresponding to the total number of steps in the pace plus one, and for homing the switch 220 at the initial or No. 1 contact position. This is accomplished by moving the switch 250 to the right as in the prior modifications.

When the switch 250 is in the normal position as illustrated, it is effective to ground one terminal of the relays 230 and 240 so that these relays are in condition for operation. The relay 230 includes contacts 231, 232 and 233 with the contacts 231 and 232 being included in holding circuits and the contacts 233 being the main contacts for energizing the switch 210 through the operating switch 252. Similarly, relay 240 includes holding contacts 241 and 242 used in holding circuits and contacts 243 for connecting switch 220 to the operating switch 252. The contact levels 214 and 224 of switches 210 and 220, respectively, are directly interconnected and various other contact levels are interconnected through slip contacts. More specifically, contact levels 215 and 216 are interconnected through contact members 260 and 261, levels 216 and 217 are interconnected through contact members 262 and 263, contact members 217 and 218 are interconnected through members 264 and 265, contact levels 218 and 225 are interconnected through contact members 266 and 267, contact levels 224 and 226 are interconnected through members 268 and 269, levels 226 and 227 through members 270 and 271, and contact levels 227 and 228 through contact members 272 and 273.

In setting up the system for operation, the adjustable contact plate 251 must be positioned so that the contact on level 213 corresponding to one more than the total number of steps in the pace is open. The system illustrated is set up to operate at a pace of eight steps and the switch 210 must be homed to be eight positions away from the No. 1 position, or on contact No. 9. Accordingly, the contact plate 251 is positioned so that the No. 9 contact on level 213 is open. The extra contact levels 216, 217 and 218 on switch 210 and contact levels 226, 227 and 228 on switch 220 permit control operations at steps intermediate the pace. In the system shown, at the start the relay 240 is energized through contact 9 of level 215 and connects stepping switch 220 to the source of pulses. Differential connections are provided which are adjusted so that when switch 220 moves two steps, the terminal W at level 228 will be energized, at three steps the terminal X at level 216 will be energized, at four steps the terminal Y at level 217 will be energized, at five steps the terminal V at level 227, at six steps the terminal U at level 226, and at seven steps, the terminal Z at level 218 will be energized. After eight steps the relay 230 will be energized through contact 9 of level 224. The intermediate operations are accomplished by positioning member 261 with respect to member 260 so that a slip of three contacts is provided. That is, contact 1 of member 261 engages contact 4 of member 260. To provide energization of terminal Y after one additional step or four steps, members 262 and 263 are positioned for providing a slip of one contact. To provide energization of terminal Z after three additional steps or seven steps, a slip of three contacts is provided by members 264 and 265. It will be apparent that levels 215 and 225 in Fig. 3 correspond to levels 14 and 24 in Fig. 1 and, therefore, a total slip between these levels corresponding to the total pace will be required. The total will automatically add up the total slip between these levels and if one part of the pace is to be increased, the slip corresponding to this part can be increased and the total pace will be automatically increased. The slip between members 268 and 269 is two steps, between 270 and 271 is one additional step, and between 272 and 273 is three steps. These slips indicate the steps measured from the end of the pace at which the terminals U, V and W are energized.

Considering now the operation of the system, first the switches 210 and 220 are homed so that the contact members of switch 210 are all at contact 9. Relay 240 will then be energized through switch level 215, contact 9 of member 260, contact 6 of member 261, contact 6 of member 262, contact 5 of member 263, contact 5 of member 264, contact 2 of member 265, contact 2 of member 267, contact 1 of member 266, and contact 1 of level 225 which is connected to minus potential by the movable contact. This will cause relay contacts 243 to be closed connecting stepping switch 220 to the main operating switch 252. As pulses are provided by intermittent closing of operating switch 252, step-by-step operation of switch 220 will take place. The switch 220 moves until the movable contact at level 228 engages contact 3. It will be seen that terminal W at level 228 is then connected to minus potential through contact 3 of member 273, contact 6 of member 272, contact 6 of member 271, contact 7 of member 270, contact 7 of member 269, contact 9 of member 268, and the movable contact of level 214 which engages contact 9. As the switch 220 moves one further step, the terminal X will be connected to minus potential by the movable contact at level 225 through contact 4 of member 266, contact 5 of member 267, contact 5 of member 265, contact 8 of member 264, contact 8 of member 263, contact 9 of member 262, and the movable contact of level 216. After the stepping switch 220 moves one additional step, terminal Y of level 217 will be connected to minus potential through contact 5 of member 266, contact 6 of member 267, contact 6 of member 265, contact 9 of member 264, and movable contact of level 217. In a similar manner, movement of the switch 220 through the fifth, sixth and seventh steps causes energization of the terminals V, U and Z, respectively. When the switch 220 makes one further step to complete the eight steps of the pace, the movable contact of level 224 will engage contact 9 which is directly connected to contact 9 of level 214 so that the movable contact of level 224 is connected to minus potential and the relay 230 will be energized. Operation of this relay will open contacts 232 releasing the holding circuit of relay 240 and close contact 233 for connecting switch 210 to the main operating switch 252. It is, therefore, seen that while the switch 220 completes the eight steps in the pace, controls can be provided by terminals W, X, Y, V, U and Z at steps intermediate the complete pace.

The next pace is provided by movement of stepping switch 210. Operation of the main operating switch 252 will cause stepping switch 210 to operate until the switch completes the pace of eight steps. At this point it will be apparent that the movable contact at level 215 will engage contact No. 7 which is connected through contact 7 of member 260, contact 4 of member 261, contact 4 of member 262, contact 3 of member 263, contact 3 of member 264, contact 10 of member 265, contact 10 of member 267 and contact 9 of member 266 to contact 9 of level 225 which is now engaged by the movable contact. Accordingly, the relay 240 will be connected to minus potential through the stated connections and contacts 231 open to release relay 230, and contacts 243 close to connect switch 220 to the main operating switch 252. Intermediate operations can be provided during the pace produced by movement of the stepping switch 210 through the levels 216, 217 and 218 of switch 210 and the levels 226, 227 and 228 of switch 220. Although the paces accomplished by the switches 210 and 220 corresponding to one set of homing positions must extend over the same number of steps, the intermediate operations may be provided at different steps within the paces.

The following table indicates the steps at which the terminals are energized during operation of each stepping switch with the connections illustrated in Fig. 3.

|  | Switch 220 | Switch 210 |
| --- | --- | --- |
| Step 1 | None | Z. |
| Step 2 | W | U. |
| Step 3 | X | V. |
| Step 4 | Y | Y. |
| Step 5 | V | X. |
| Step 6 | U | W. |
| Step 7 | Z | None. |
| Step 8 | Relay 230 | Relay 240. |

It will be noted that a reciprocal pattern exists with the steps at which the terminals are energized during movement of switch 210 being inverse to that during movement of switch 220. It will be apparent that the members providing the slip can be set up to provide a very large number of combinations to meet many different requirements. The various terminals may be de-energized during movement of either switch 210 or 220 by the provision of additional contacts on the relays 230 and 240 to disconnect certain of terminals when either switch 210 or switch 220 is completing its pace. Completely independent operation can be provided during the paces of switches 210 and 220 by disconnecting the equipments connected to terminals X, Y and Z when switch 210 is stepping and by disconnecting equipments connected to terminals U, V and W when switch 220 is stepping. In such operation, if it is desired that the intermediate steps be the same in all paces, the slip members can be interlocked to reduce the number of separate members to be set up. Also the equipment can be set up so that two successive paces, that is, the pace produced by switch 220 and the pace produced by switch 210 form one double pace which will then be continuously repeated. Other different modes of operation will be apparent to those skilled in the art.

Figure 4:
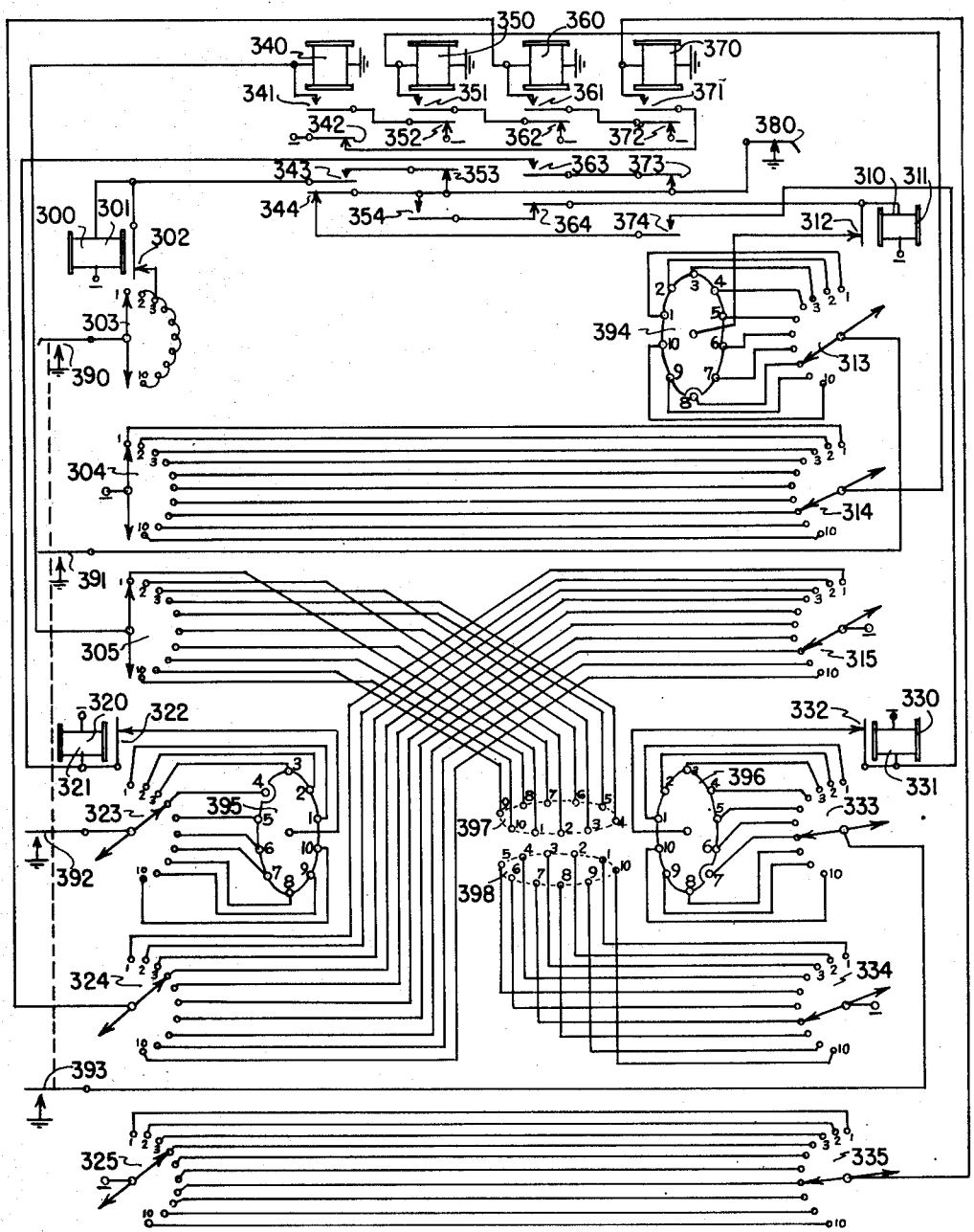
Fig. 4 illustrates a more complicated system in which a plurality of paces of different extent can be provided and continuously repeated.

In Fig. 4 there is illustrated a modified system in which a plurality of paces of different extent can be provided in sequence and continuously repeated. This system includes four stepping switches 300, 310, 320 and 330 and four associated relays 340, 350, 360 and 370. The switch 300 includes actuating mechanism 301, interrupter contact 302 and contact levels 303, 304 and 305. The switches 310, 320 and 330 contain identical components which are similarly numbered. The relays each include two normally open contacts and two normally closed contacts for establishing operating and holding circuits. Relay 340 includes contacts 341, 342, 343, and 344, and relays 350, 360 and 370 include similarly numbered contacts. A main operating switch 380 is provided which is adapted to be intermittently operated as in previous modifications.

One level of each of the stepping switches is provided for homing the switches with the contacts of the homing level of each switch being connected through the interrupter contact to bring the switch to a predetermined initial position. The homing switch includes contacts 390, 391, 392 and 393 which may be ganged together for operation by a single member. The switch 390 is arranged to bring the stepping switch 300 to the No. 1 contact position for initial operation. The stepping switch 310 may be homed in any desired position depending upon the extent of the first pace in the sequence with the number of steps in the pace being determined by the setting of the adjustable contact plate 394. The proper setting is determined by the number of steps between the No. 1 contact and the contact not engaged by the contact plate 394. If the first pace is to include seven steps the contact plate 394 should be set so that the No. 8 contact is open as shown in the figure. Similarly, if the first pace includes six steps the contact plate should be positioned so that the No. 7 contact is in open position. It is apparent that when switch 391 is closed the switch 310 will move until the open contact of the level 313 is engaged.

Stepping switch 320 includes a similar homing arrangement including the level 323, adjustable contact plate 395 and the switch 392. When setting the adjustable contact plate 395 the number of steps in the first and second paces must be considered. If the first pace is seven steps as stated above and the second pace is six steps, the contact plate 395 must be set so that the member 4 contact, which is thirteen steps from the No. 1 contact, must be open. When the total number of steps is greater than ten only the units digit need be considered. The switch 330 has a homing arrangement identical to that of switches 310 and 320, including the contact level 333, adjustable contact plate 396 and the switch 393. In setting this contact plate 396, the number of steps in the three paces must be considered. The contact plate is shown with the No. 7 contact open which would be proper when the first pace is seven steps, the second pace is six steps, and the third pace is three steps. In this system the total number of steps in each pace must be limited to the number of contacts on the switches being used. However, the total number of steps in the several paces which operate in sequence need not be limited to the total number of contacts on a switch.

A differential connection is required between the contact level 305 and the contact level 334. This connection includes members 397 and 398 which are relatively movable with respect to each other. The differential connection between the members 397 and 398 must correspond to the units digit of the total number of steps in the three paces and, therefore, corresponds to the position of the contact plate 396. Although the system is illustrated with switches having ten contacts and units and tens digits are referred to, it is obvious that switches having more contacts can be used and the differential connections computed in a generally similar manner.

Considering now the operation of the system of Fig. 4, when the four switches are homed it will be apparent that the relay 340 is actuated through level 305 and level 334. This connects the stepping switch 300 in series with the main operating switch 380. As this switch is intermittently operated, the switch 300 will continue in a step-by-step manner until contact 8 is engaged. At this point connection will be made through levels 304 and 314 to energize relay 350. Energization of relay 350 will break contacts 353 thereby disconnecting the stepping switch 300 from the main operating switch 380 and also disengaging the contacts 352 in the holding circuit of the relay 340. The relay 350 will, through contacts 354, energize stepping switch 310 to cause this switch to start. This switch 310 will continue in a step-by-step manner until six steps have been made which causes contact 4 to be engaged. Connection is then made through level 315 and 324 to energize relay 360. This relay will disconnect both stepping switch 310 and the holding circuit through relay 350 and will cause the stepping switch 320 to be connected in series with the main operating switch. Stepping switch 320 will then move in a step-by-step manner three steps until contact 7 is engaged. At this point connection is made through levels 325 and 335 to energize relay 370. This breaks the circuit through stepping switch 320 and also the holding circuit for relay 360 and is effective to connect stepping switch 330 in series with the main operating switch 380. Switch 330 will then move in a step-by-step manner until it has moved through seven steps. At this point the movable switch contacts will engage contact No. 4. At this point connection is made through levels 334, contact 4 of member 398 and contact 8 of member 397 and level 305 for energizing the relay 340. It is to be pointed out that the switch 300 is now in a position in which the contacts No. 8 are engaged. The sequence will continue with the switch 300 moving through six steps, the switch 310 through three steps, and the switch 320 through seven steps. It will be apparent, therefore, that paces having 7, 6, and 3 steps are continuously repeated.

The systems of Figs. 3 and 4 as illustrated are based on a system in which the steps in each pace are limited to the number of contacts on the stepping switches used. It is obvious, however, that these systems can be modified in accordance with Fig. 2 to include a plurality of switches in a multiplying arrangement to provide paces having a great number of steps. In the event that the switches are used to operate equipment in which it is important that certain operations are not initiated before certain other operations are successfully completed, various interlocking arrangements may be provided.

As previously stated, the pace making circuit as disclosed can be used in various different control applications. By using properly designed relays and step-by-step devices the system can be made to operate very rapidly, the step-by-step devices being generally the limiting factor. However, stepping switches are now available which will provide stepping operations at the rate of approximately 100 operations per second and chains of electron tubes would operate much faster, for example. In the system described in Figs. 1 and 3, an interval between paces is required for actuation of one relay, which releases the other relay, which in turn disconnects the stepping switch which has been operating. This interval can be reduced by providing an additional set of contacts on the relays so that the actuation of the relay directly disconnects the stepping switch which has been operating as well as connecting the other stepping switch. Such a system is illustrated by Fig. 2 in which relay contacts 35 and 45, which are normally closed, are opened by operation of the relays 30 and 40, respectively. The contact 35 is in series with the stepping switch 20 to disconnect the switch 20 as soon as the relay 30 is operated. Similarly, contacts 45 disconnect stepping switch 10. It is obvious that this arrangement can also be used in the systems of Figs. 1 and 3.

In the event that still faster operation is required, a system as disclosed in Fig. 5 can be used which utilizes two additional contact levels such as the extra levels 16, 17, 26 and 27 of the switches 10 and 20 in Fig. 1. As illustrated in Fig. 5 the contact levels 16 and 26 can be bridged across the actuating mechanism 11 of the switch 10 to short out the actuating mechanism as soon as the switches reach the predetermined positions terminating a pace. This eliminates the time required for the relay 40 to act to disconnect relay 30 and for this relay 30 in turn to disconnect the actuating mechanism 11. When using such a system a resistor 150 must be provided in series with the actuating mechanism to prevent short circuiting of the power supply when the mechanism 11 is shorted out. The actuating mechanism 21 can similarly be shorted out by the levels 17 and 27 and in this circuit a series resistor 151 may be provided. The levels 16 and 26, and the levels 17 and 27 form in effect normally open circuits which close at the end of each pace. The system as illustrated in Fig. 5 is not limited to use for providing faster operation of the system between paces, but may be used for actuating auxiliary equipment either at the end of a pace or at any intermediate point within a pace.

When used as a counter the main operating switch 50 of Figs. 1 and 2 and similarly the main operating switches 252 of Fig. 3 and 380 of Fig. 4 can be operated in any manner desired. The operating switch may be provided as contacts of a relay which obviously can be included in any control circuit. When used as a timing system the main operating switch may be controlled by pulses from any source such as electronic pulse producing apparatus which are available or mechanically driven interrupting or pulse producing means. As previously stated, the pulses can be equally or unequally spaced, and pulses having different spacing can be intermixed in any desired manner. Pulses can be provided by any source and may indicate any condition of equipment being controlled to provide further control operations.

Simple systems can be provided for producing pulses operating at the frequency of the standard alternating current power lines. For example, the coils of the stepping switches may be connected by the relays directly to an alternating current power line through a rectifier such as a dry selenium rectifier. In this case, the pulses are supplied to the stepping switches from the power line itself. Frequency dividing arrangements can be provided for operating the system from an alternating current source at a frequency which is a sub-multiple of the source frequency. That is, the system could be arranged so that a pulse is applied to the stepping switches after any given number of cycles, or half cycles such as after two or three cycles. It is to be noted that the standard power frequency of 60 cycles per second is within the speed limitations of the stepping switches.

If desired, a plurality of pulse producing units operating at different time intervals can be provided and the units may be selectively switched into the system in any various manners. For example, in a simple system as illustrated in Fig. 1, interrupting mechanism operating at a first speed can be used to actuate the switch 50 while the stepping switch 20 operates, and at the end of the first pace, the relay 30 can be used to connect an interrupting mechanism operating at a different time interval so that the pace produced by the switch 10, although including the same number of steps, is of a different time duration. It is obvious that pulses of different spacing can be combined at intermediate points within the paces. Various other modifications and applications of the equipment will be obvious to those skilled in the art.

The system disclosed is particularly advantageous in that the successive paces are provided without resetting of the switches. That is, after one pace has been completed the other switch merely continues on to produce the next pace and does not revert back to a fixed position or continue on until a fixed position is reached before starting the next pace. This results in a faster operating system since the time for resetting is completely eliminated. Also it results in longer life of the apparatus as the switch contacts are not worn by the movement of the movable contacts during resetting movement. It is apparent that, especially with paces having very few steps, this reduction in wear is very great. Another important factor contributing to the life of the switches is that the contacts of the stepping switches carry current only for an instant at the end of each pace. That is, only the contacts engaged at the end of each pace carry current, and this current is reduced very quickly because a parallel holding circuit is set up through the relays. The contacts of the stepping switches which carry current are opened only after the parallel circuit has been set up so that the contacts of the switches do not actually break a current carrying circuit. Similarly the contacts of the transfer levels, as in Fig. 2, only carry current at one particular contact during each complete operation of the stepping switches. The life of the switches is further increased in that only half of the steps are performed on each switch. Also the number of contacts on each level can be very large to further increase the life of the apparatus.

The system disclosed does not depend on particular switch structures but can be practiced with various step-by-step operating structures. There is also no required relationship between the number of steps in a pace and the number of contacts on the stepping switches, except of course, in simple systems as illustrated in Fig. 1, where the number of steps cannot exceed the number of contacts on each stepping switch. As there is no direct relationship between the steps and contacts, one system can be used in many different applications providing flexibility not possible in prior systems. More specifically, by proper setting of the slip members, a system can be used for a large number of different control purposes in which different intervals are required. For example, the pace making system may be used as a brain or nervous system for controlling a plurality of interrelated functions and can cause operation of the individual functions at desired time intervals or after certain processes have been completed because any pulse producing device can be used to operate the system.

Paces having a large number of steps can be provided by the use of switches having a large number of contacts on each level. Also the use of a plurality of switches in cascade as illustrated in Fig. 2 permits operation on paces having a large number of steps. It is to be pointed out that the multiple system of Fig. 2 is not applicable only to a simple system as illustrated in Fig. 1, but can also be used in systems in accordance with Figs. 3 and 4. When using a plurality of switches in cascade in each operating unit, only one relay is still required for each operating unit. The setting of the system to count any desired number does not require a plurality of relays or an arrangement in which a large number of intermediate contacts are required. This is an important feature, both in the saving of cost in the original equipment, and in the maintenance cost as such contacts may become defective and interfere with the operation of the system.

While I have described certain embodiments of my invention which are illustrative thereof, it is apparent that various modifications and changes can be made therein without departing from the intended scope of the invention as defined in the appended claims.

I claim:

1. Pace making apparatus comprising first and second step-by-step operating devices, means for homing said devices so that said first device is brought to an initial condition and said second device is operated beyond a corresponding initial condition by a predetermined number of steps which form the pace, a source of pulses, and control means including a pair of responsive devices for connecting said step-by-step devices to said source of pulses, said control means connecting said first step-by-step device to said source of pulses for operation thereof through said predetermined number of steps and thereafter connecting said step-by-step devices to said source of pulses for operation through said predetermined number of steps in an alternate manner, said responsive devices operating between said successive paces to operate an external control.

2. A pace making system including first and second devices which operate in a given direction only and in a step-by-step manner, control means interconnecting said devices so that said devices alternately stand at rest and operate through a predetermined number of steps which form a pace, said control means including portions for stopping the operation of each device when a pace is completed thereby and for starting operation of the other device, and means connected to said control means and operating between successive paces for performing a control function.

3. A pace making system including a plurality of members movable in a given direction only in a step-by-step manner, operating means for moving said members, control means for said operating means connected to at least two of said members, said control means causing said operating means to move said members in turn and including portions operating after each of said members has completed a predetermined number of steps for stopping said operating means of the said member and starting the operating means of another member, and means operated between successive paces capable of performing control functions.

4. Apparatus for operating controls at predetermined time intervals comprising means for producing pulses which occur at regular time intervals, a pair of stepping switches, and a circuit for alternately connecting said switches to said pulse producing means for causing operation thereof, said circuit including a portion operating after each of said switches has received a predetermined number of pulses for connecting the other of said switches to said pulse producing means, said control circuit including control means for performing a control function each time said predetermined number of pulses has occurred.

5. A pace making system comprising a plurality of step-by-step operating devices each including a plurality of contact means and driving means, a source of pulses, and a control circuit including said contact means for connecting said driving means in turn to said source of pulses, said control circuit operating to disconnect the driving means of each step-by-step device from said source of pulses after said device has completed a pace including a predetermined number of steps and to connect the driving means of the next step-by-step device thereto, said control circuit providing current through said contact means only at the end of each pace.

6. Pace making apparatus comprising first and second stepping switches including a plurality of contacts, first and second relays respectively associated with said stepping switches and each including at least three sets of contacts, a source of pulses, a circuit including one set of contacts of each relay connecting said source of pulses to said stepping switches for selectively applying pulses to the stepping switch associated with the relay which is actuated, a holding circuit for said first relay including the second set of contacts of each relay for holding said first relay actuated until said second relay is actuated, a holding circuit for said second relay including the third set of contacts of each relay for holding said second relay actuated until said first relay is actuated, and an operating circuit including contacts of said stepping switches and said first and second relays for actuating each relay after the stepping switch associated with the other relay has advanced a predetermined number of steps.

7. Pace making apparatus comprising first and second stepping switches, first and second relays individually associated with said switches, a source of pulses, a circuit including said relays for connecting each stepping switch to said source of pulses when the relay associated therewith is actuated, interlocking means including said relays for holding each relay actuated until the other relay is actuated, and an operating circuit including said stepping switches and said relays for actuating each relay when the switch associated with the other relay has advanced a predetermined number of steps.

8. Pace making apparatus comprising first and second stepping switches having a plurality of fixed contacts arranged in a plurality of levels and movable contacts associated with each level, first and second relays individually associated with said switches, a circuit including said stepping switches and said relays for connecting the associated stepping switch to a source of pulses when each relay is actuated, interlocking means including said relays for holding each relay actuated until the other relay is actuated, a second circuit including said first relay and conductor means interconnecting corresponding contacts of one level of each of said switches, said second circuit energizing said first relay when said switches are at corresponding positions, and a third circuit including said second relay and differential means interconnecting contacts of a second level of said first and second switches with the contacts of said second switch being connected to contacts of said first switch which are advanced by a predetermined number, said third circuit energizing said second relay when said switches are at positions differing by said predetermined number.

9. Pace making apparatus comprising first and second stepping switches including a plurality of contacts, first and second relays respectively associated with said stepping switches and each including at least two sets of contacts, a source of pulses, a circuit connecting said source of pulses to said stepping switches including one set of contacts of each relay for connecting said pulses to the stepping switch associated with the relay which is actuated and a second set of contacts of each relay for disconnecting the pulses from the stepping switch associated with the relay which is not actuated, interlocking means including said relays for holding each relay actuated until the other relay is actuated, and an operating circuit including contacts of said stepping switches and said first and second relays for automatically actuating each relay after the stepping switch associated with the other relay has advanced a predetermined number of steps.

10. A pace making system comprising a plurality of stepping switches each including a plurality of fixed contacts, a movable contact associated with said fixed contacts, and driving means for said movable contacts, means for homing said switches so that said movable contacts are brought to predetermined initial positions, a source of pulses, and a control circuit connecting said driving means to said source of pulses and including conductor means interconnecting said switch contacts in such manner that said driving means of each switch is disconnected from said source of pulses after it has completed a pace including a predetermined number of steps and said driving means of the next switch is connected thereto, said control circuit including means operating between successive paces for performing additional control functions.

11. A pace making system comprising a plurality of stepping switches each including a plurality of mechanically interconnected movable contacts, driving means for said movable contacts and a group of fixed contacts associated with each movable contact, means for homing said switches so that said movable contacts thereof are brought to predetermined initial positions, a source of pulses, and a control circuit connected to said switch contacts, said driving means and said source of pulses for selectively connecting said driving means in turn to said source of pulses, said control circuit disconnecting each driving means from said source of pulses after the switch of which it forms a part has completed a pace including a predetermined number of steps and connecting the driving means of the next switch thereto, said control circuit including means for simultaneously changing the interconnections between said fixed contacts for changing the number of steps in said paces.

12. A pace making system comprising a plurality of stepping switches each including a plurality of fixed contacts arranged in different levels, a plurality of mechanically interconnected movable contacts associated with said levels and driving means for said movable contacts, a circuit connected to the contacts of one level of each switch and to said driving means thereof for homing said switches so that said movable contacts are brought to predetermined initial positions, a source of pulses, and a control circuit connected to said driving means and to said source of pulses and including conductor means for interconnecting the fixed contacts of at least two other of said levels of each switch to the fixed contacts of other levels of other switches, said control circuit connecting said driving means of said switches in turn to said source of pulses and disconnecting each driving means from said source of pulses after the switch of which it forms a part has completed a pace including a predetermined number of steps, said conductor means being adjustable to change the interconnection between said fixed contacts to thereby change the number of steps in said paces, said control circuit including means operating between successive paces for performing additional control functions.

13. A pace making system including a plurality of devices which operate in a step-by-step manner, control means interconnecting said devices so that each device operates through a pace comprising a predetermined number of steps while the other device is inoperative, said control means including a portion rendering each device inoperative after the pace is completed thereby and initiating operation of the other device so that said devices operate continuously in an alternate manner, and means operated between successive paces for performing control functions.

14. Apparatus for repeatedly counting a predetermined number of events comprising first and second stepping switches, means for producing pulses corresponding in time to the occurrence of said events, a control circuit for connecting said switches to said pulse producing means so that said pulses are applied to one of said switches for operating the same until said predetermined number has been counted and then said pulses are applied to the other of said switches for operating the same until said predetermined number has been reached, said control circuit continuing to apply said pulses to said switches in an alternate manner and including a control member which operates each time said predetermined number has been counted.

15. Apparatus for repeatedly counting a predetermined number of events comprising first and second operating units each including a pair of stepping switches, said stepping switches including a given number of fixed contacts and movable contacts for engaging said fixed contacts in a step-by-step manner, means for producing pulses corresponding in time to the occurrence of an event, a control circuit connecting said operating units to said pulse producing means so that one of said units operates until said predetermined number has been counted and then the other of said units operates until said predetermined number has been counted, said control circuit applying said pulses to one of said switches of each operating unit for operating the same one step each time a pulse is applied thereto, each of said units including an auxiliary circuit for applying a pulse to the other of said switches of each unit for operating the same one step each time said movable contact of said one switch passes the fixed contact preceding that from which said one switch started, said control circuit including a member for performing a control function each time said predetermined number has been counted.

16. Pace making apparatus comprising means for producing pulses, a plurality of pulse actuated step-by-step devices, and control means connected to said devices and to said pulse producing means, said control means individually connecting each of said devices to said pulse producing means for actuation thereby, with said control means connecting each of said devices for a number of pulses which forms a pace, said control means disconnecting each device after a pace is completed thereby and connecting the next of said devices to said pulse producing means for a number of pulses which form another pace, said control means providing continuing operation of said devices in a repeating sequence and including a control member for performing a control function after operation of each device.

17. Pace making apparatus comprising means for producing pulses, a pair of stepping switches each including a plurality of fixed contacts arranged in levels, mechanically interconnected movable contacts associated with each level and driving means for said movable contacts, a circuit connecting said driving means to a source of pulses including conductor means interconnecting said fixed contacts of different levels, said circuit including portions individually associated with said switches and rendered operative when the associated switch moves a predetermined number of steps to form a pace for disconnecting the switch which has moved from said source of pulses and connecting the other switch thereto, so that one of said switches operates for a pace including a predetermined number of steps and then the other of said switches operates for said pace with said switches continuing alternately, said conductor means interconnecting said fixed contacts of certain of said levels so that control operations are provided through said movable contacts of said levels after certain steps in each pace.

18. Apparatus in accordance with claim 17 in which said conductor means interconnecting said fixed contacts are adjustable to change said predetermined number of steps in each and also to change the steps in each pace after which said control operations are provided.

19. Pace making apparatus including in combination, first and second pulse operated step-by-step devices, means for homing said devices so that said devices are brought to predetermined positions, and control means including a pair of responsive devices for connecting said step-by-step devices to a source of pulses, said control means connecting one of said step-by-step devices to the source of pulses for operation thereof through a predetermined number of steps, said responsive devices operating to disconnect each step-by-step device from the source of pulses after operation thereof through said predetermined number of steps and to connect the other device thereto, said responsive devices being adapted to operate an external control.

20. Pace making apparatus operating from recurring pulses including in combination, a pair of stepping switches each including a plurality of fixed contacts arranged in levels, mechanically interconnected movable contacts associated with each level and driving means for said movable contacts, a circuit alternately connecting said driving means to a source of pulses, said circuit including portions individually associated with said switches and rendered operative when the associated switch moves a predetermined number of steps to form a pace for disconnecting the switch which has moved from said source of pulses and connecting the other switch thereto, so that one of said switches operates for a pace including a predetermined number of steps and then the other of said switches operates for said pace with said switches continuing alternately, said circuit including conductor means interconnecting said fixed contacts of certain of said levels of at least one of said switches for providing control operations through said movable contacts of said levels associated therewith after certain steps in each pace.

21. Pace making apparatus including in combination, first and second pulse operated step-by-step devices, each of said devices having a given number of positions and being adapted to operate through said positions in turn in response to pulses, means for homing said devices so that said devices are brought to predetermined initial positions, a source of pulses, and control means for connecting said devices to each other and for alternately connecting said devices to said source of pulses so that said devices are alternately operated thereby, said control means including portions selectively connected to said devices for setting the number of positions through which each device is operated each time said device is connected to said source of pulses at any predetermined number less than said given number of positions of said devices, said control means including means energized by said portions after each device has operated through said predetermined number of positions to disconnect the device which has operated from said source of pulses and to connect the other device thereto, with each of said devices completing each operation thereof at any one of said positions and starting the next operation thereof from the position where the preceding operation was completed.

22. Counting apparatus including in combination, first and second stepping switches each having at least first and second levels of fixed contacts, with each level having a given number of fixed contacts, and movable contacts associated with each level and adapted to engage said fixed contacts thereof in sequence, first and second relays individually associated with said switches, a source of potential, a circuit including said stepping switches and said relays for connecting the associated stepping switch to a source of operating pulses when each relay is actuated, interlocking means including said relays for holding each relay actuated until the other relay is actuated, a second circuit including conductor means interconnecting corresponding fixed contacts of said first levels of said first and second stepping switches, said second circuit connecting said movable contact of said first level of said first switch to said source of potential and said movable contact of said first level of said second switch to said first relay, said second circuit energizing said first relay when said switches are at corresponding positions to apply pulses to said first stepping switch, and a third circuit including conductor means interconnecting contacts of said second levels of said first and second switches with the contacts of said second switch being connected to contacts of said first switch which are advanced by a predetermined number, said predetermined number being less than said given number of fixed contacts but being otherwise unrelated thereto, said third circuit including conductors connecting said movable contact of said second level of said second switch to said source of potential and connecting said movable contact of said second level of said first switch to said second relay, said third circuit energizing said second relay when said first switch is at a position advanced with respect to said second switch by said predetermined number to apply pulses to said second stepping switch, whereby said switches operate in turn in response to the operating pulses with each switch moving over said predetermined number of contacts on each operation.

JACQUES BERGER.

References Cited in the file of this patent
UNITED STATES PATENTS

| Number | Name | Date |
|---|---|---|
| 2,049,634 | Troutman | Aug. 4, 1936 |
| 2,087,860 | Nichols | July 20, 1937 |
| 2,269,043 | Spaunberg | Jan. 6, 1942 |
| 2,269,330 | Andren | Jan. 6, 1942 |
| 2,322,712 | Hazard | June 22, 1943 |
| 2,346,869 | Poole | Apr. 18, 1944 |
| 2,383,702 | Beveck | Aug. 28, 1945 |
| 2,415,854 | Sheffield | Feb. 18, 1947 |
| 2,432,727 | Crothers | Dec. 16, 1947 |
| 2,517,559 | Haigh et al. | Aug. 8, 1950 |

OTHER REFERENCES

Predetermined Counters, Wild, article in "Electronics," March 1947; pages 120, 121, 122, 123.

Predetermined Counter, Blume, article in "Electronics," February 1948; pages 88, 89, 90, 91, 92 and 93.